Figure 1:
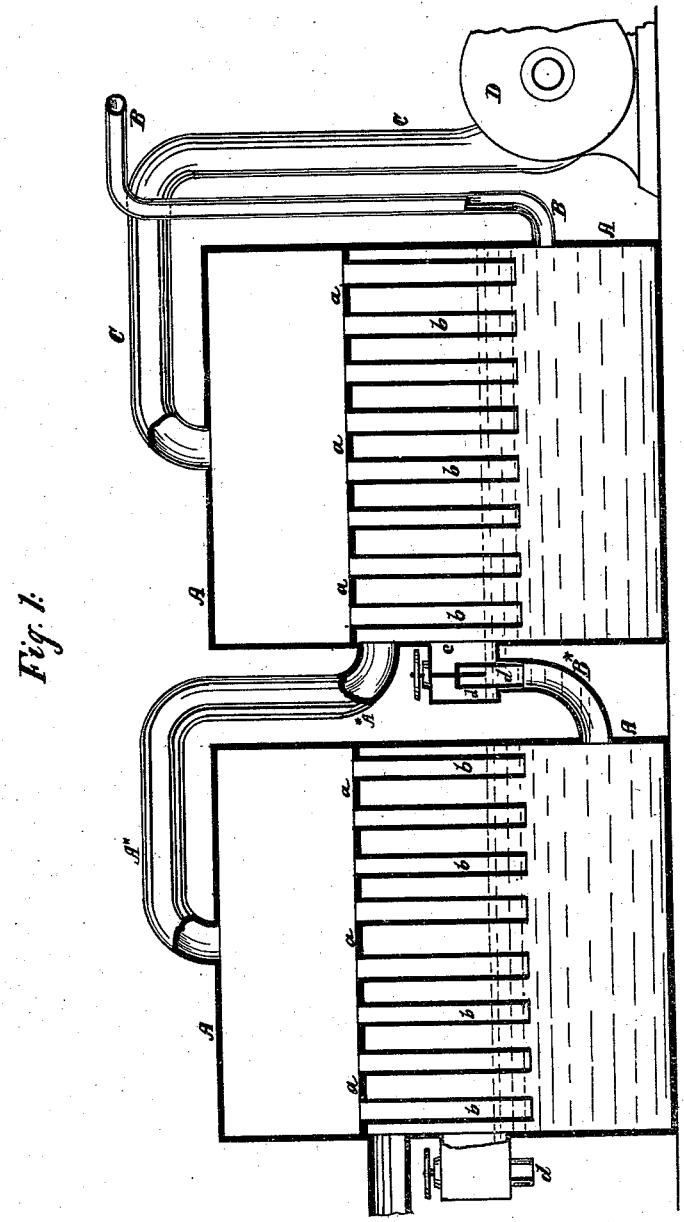

W. H. ST. JOHN.
Apparatus for Purifying Illuminating Gas.

No. 154,350. Patented Aug. 25, 1874.

2 Sheets--Sheet 1.

Witnesses

Inventor

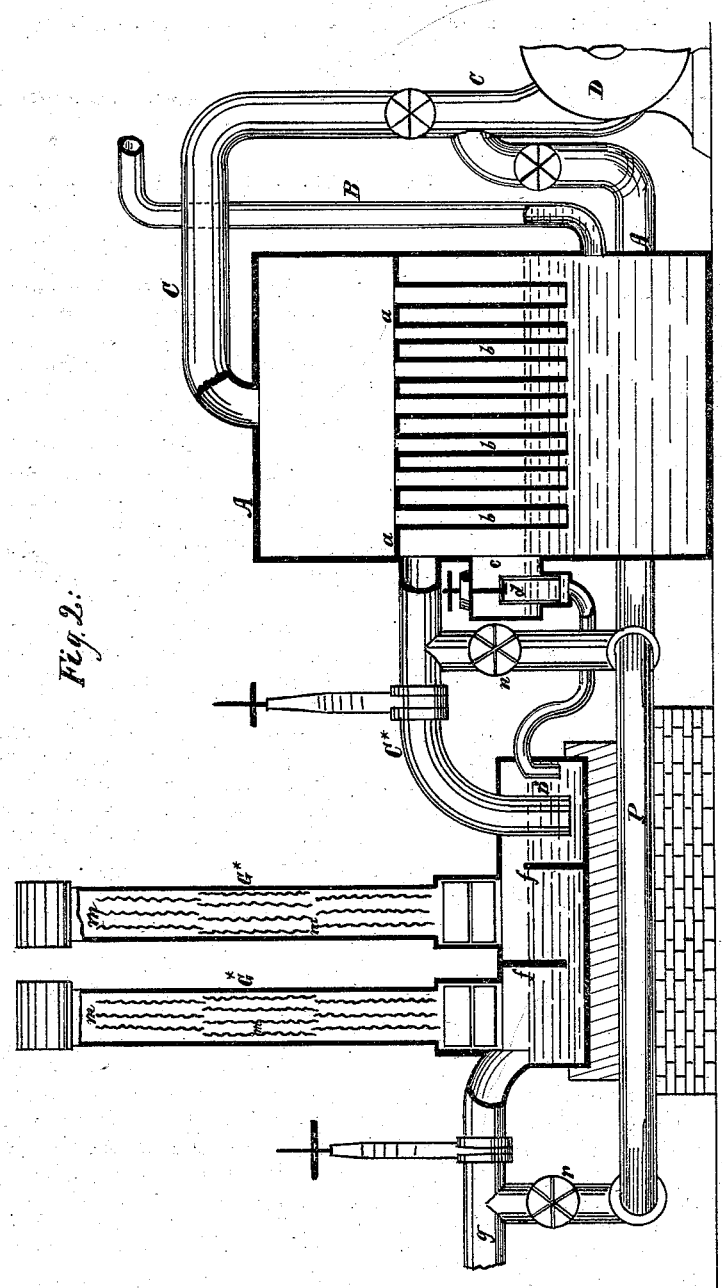

UNITED STATES PATENT OFFICE.

WILLIAM H. ST. JOHN, OF NEW YORK, N. Y.

IMPROVEMENT IN APPARATUS FOR PURIFYING ILLUMINATING-GAS.

Specification forming part of Letters Patent No. 154,350, dated August 25, 1874; application filed February 24, 1874.

*To all whom it may concern:*

Be it known that I, WILLIAM H. ST. JOHN, of the city, county, and State of New York, have invented an Improvement in Apparatus for Purifying Illuminating-Gas, of which the following is a specification:

This invention relates to the purification of illuminating-gas, by causing it to pass through or in contact with liquid capable of absorbing, neutralizing, or otherwise removing from the gas the sulphurous and other impurities contained therein, as it passes from the hydraulic main.

The invention consists in two or more condensers or purifiers embracing this principle, combined in such relation with each other that the purifying-liquor, only partially exhausted of its virtue in one condenser, may be passed on to the next for repeated use, until its purifying properties are wholly utilized; this arrangement, furthermore, enabling the working capacity of the apparatus to be enlarged or diminished, at will, within certain limits, inasmuch as the passage of the gas to and through the apparatus may be limited to any desired number of the condensers combined for use, as aforesaid.

Figure 1 is a side view and partial vertical section of an apparatus constructed according to my invention. Fig. 2 is a similar view of a modification of the same.

The construction of the condensers employed may be varied, in any manner desired, so long as their operation includes the passage of the volume of gas through a hydraulic seal, or, in other words, through or in contact with a liquid capable of dissolving or removing the sulphurous, tarry, and other obnoxious or detrimental impurities from the gas.

For example, as shown in Fig. 1, each condenser is constituted by a chamber, A, divided by a horizontal partition, $a$, from which depend dip-tubes $b$, open at the top and bottom. A pipe, B, connects the lower portion of the ordinary hydraulic main of the gas-works with the lower portion of one of the chambers A, and a pipe, C, in which is provided an exhauster, D, connects the gas-space of the hydraulic main with the upper portion of the chamber A. The tar and ammoniacal liquor from the hydraulic main flow into the lower part of the aforesaid chamber, and the liquid is maintained therein at a height sufficient to seal the lower ends of the dip-tubes $b$. To provide for the adjustment of the depth to which the dip-tubes are thus sealed, the outlet $c$ of the chamber may be provided with a vertically adjustable valve, $d$, of any suitable construction. The ammoniacal liquor, derived from the destructive distillation of the gas-producing material in the manufacture of the gas, and which is conducted from the hydraulic main to the lower part of the chamber A, possesses, in a high degree, the properties essential in the purifying-liquid employed, as hereinbefore set forth. The dip-tubes being sealed in the liquid, the tarry particles in the gas agglomerate by the law of cohesion, and are thus separated from the gas and held in suspension in the liquid. At the same time the liquid absorbs the ammonia from the gas, and the strong ammoniacal solution thus produced neutralizes the sulphurous and carbonic acids contained in the gas as it issues from the hydraulic main. As this is essentially a chemical reaction, it follows that the liquor will retain its purifying power up to a certain point, and in order to utilize it to the utmost it is passed from the first condenser, just hereinbefore described, which, as shown in Fig. 1, is of substantially the same construction; the gas-space below the partition $a$ of the first being connected by a pipe, A*, with the upper compartment of the chamber A of the other condenser, while the lower compartment of the one connects by a pipe, B*, from its outlet-valve, $d$, with the corresponding part of the other. The gas passing down through the dip-tubes of the second condenser is again caused to pass through a hydraulic seal, with a repetition of the effects upon it experienced in passing through the first. The depth of the seal in the second condenser, as in the first, is regulated by an adjustable outlet-valve, $d$.

When desired, the second condenser may be constituted as represented in Fig. 2. In this case the gas passes from the first condenser through a pipe, C*, which dips into the liquid in a well or receptacle at D*, thereby forming a hydraulic seal. Above this receptacle are vertical pipes G*, arranged in pairs, joined at the top by caps I; the receptacle itself being divided into compartments by vertical plates $f$, so arranged that the gas rising from the hydraulic seal will pass up through one of the pipes G* of one pair, thence down the other of the same pair, then up and down through another pair, and so on until the outlet $g$ is reached. The pipes G* may be furnished internally with vertically-arranged corrugated plates $m$, situate as shown in Fig. 2, so that the volumes of gas passing through the pipes will be brought in frictional contact with the plates, and deposit upon them any slight portion of tar which may remain after the action upon the gas of the several hydraulic seals. P is a by-pass, so connected with the pipe C* and outlet $g$ that by turning the valves $r\ u$ communication with the second condenser may be shut off, and the volume of the gas conducted from the first condenser through the by-pass to the outlet.

It should be mentioned that although but one pipe C* is shown as sealed, in Fig. 2, any desired number of such pipes may be used.

It will be understood that in the use of the second condenser, as last herein described, the same, in addition to the function specified, serves to cool the gas previous to its final exit from the apparatus. It will also be understood that any desired number of condensers may be used in the series or system without affecting the principle of this my invention.

What I claim as my invention is—

The combination of two or more condensers, substantially as and for the purpose herein set forth.

WM. H. ST. JOHN.

Witnesses:
 BURR WAKEMAN,
 THOS. E. CUFF.